Jan. 6, 1959
E. C. KRUSCHE
2,866,996
WINDSHIELD WASHER DEVICE
Filed May 24, 1957
2 Sheets-Sheet 1
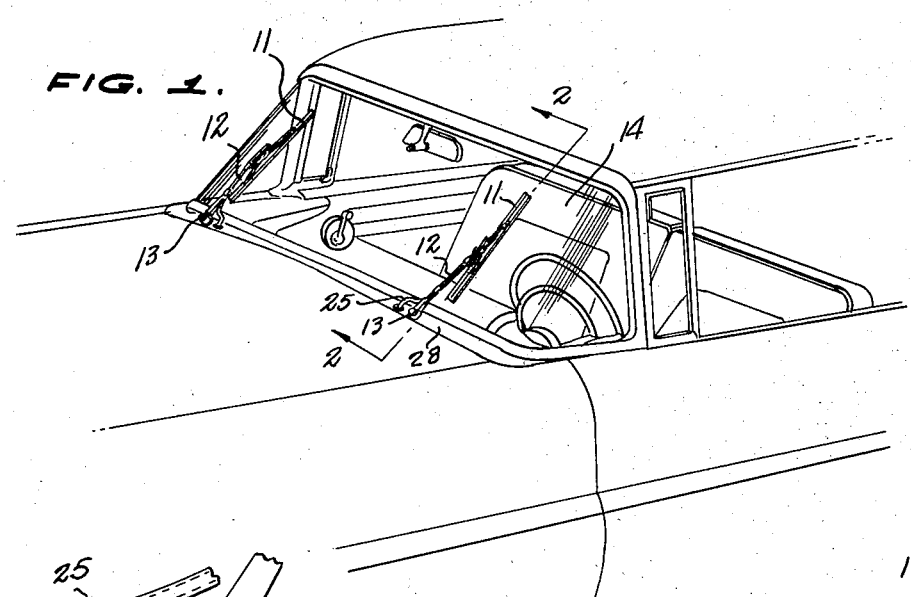
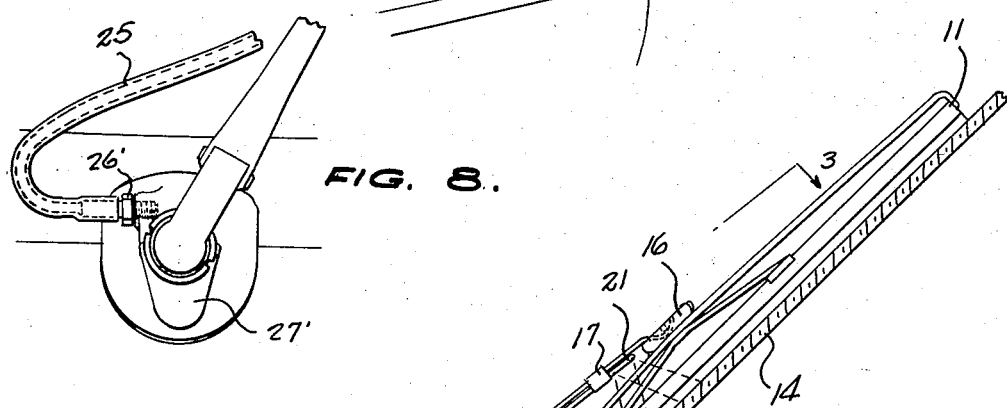
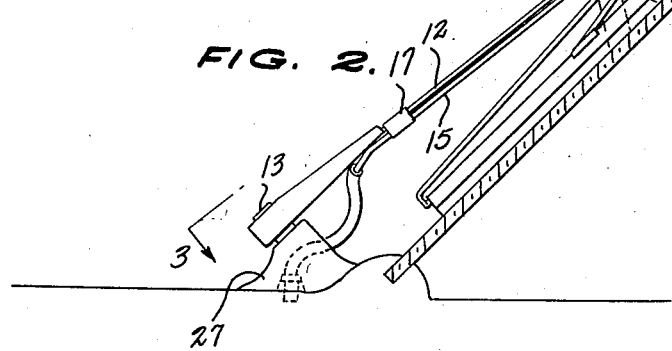
INVENTOR.
EDWIN C. KRUSCHE,
BY
McMorrow, Berman + Davidson
ATTORNEYS.

Jan. 6, 1959
E. C. KRUSCHE
2,866,996
WINDSHIELD WASHER DEVICE
Filed May 24, 1957
2 Sheets-Sheet 2
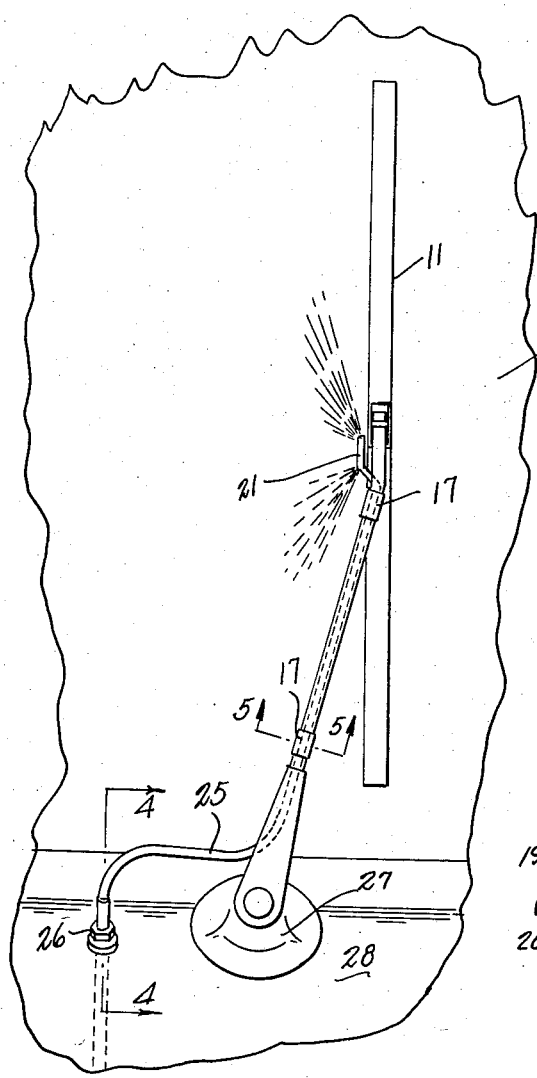
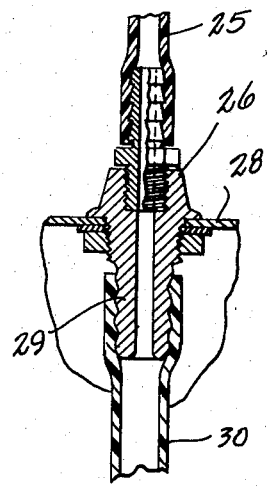
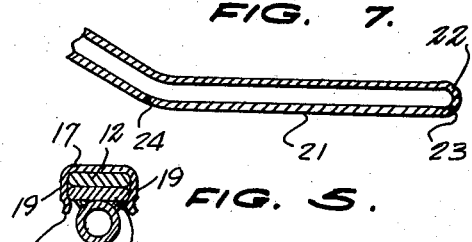
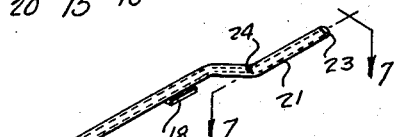
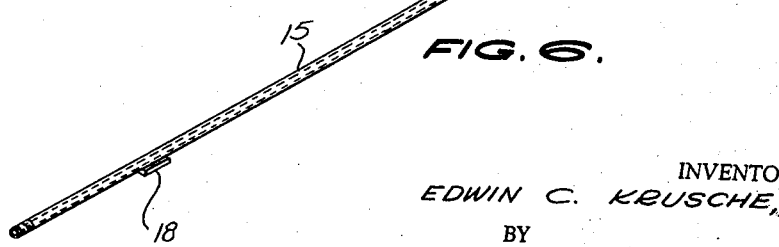
INVENTOR.
EDWIN C. KRUSCHE,
BY
McMorrow, Berman & Davidson
ATTORNEYS.

United States Patent Office 2,866,996
Patented Jan. 6, 1959

2,866,996
WINDSHIELD WASHER DEVICE

Edwin C. Krusche, Homewood, Ill.

Application May 24, 1957, Serial No. 661,527

3 Claims. (Cl. 15—250.4)

This invention relates to motor vehicle windshield wiper structures, and more particularly to a windshield washing attachment for use on windshield wipers.

A main object of the invention is to provide a novel and improved windshield wiper assembly comprising a washing attachment mounted on the wiper blade of the assembly, the attachment being simple in construction, being easy to install, and providing greatly increased efficiency in clearing and wiping the windshields with which it is employed.

A further object of the invention is to provide an improved washing attachment for use with a motor vehicle windshield wiper assembly, the attachment being inexpensive to manufacture, being durable in construction, and being arranged so that it can be easily installed on a motor vehicle in conjunction with the normal windshield wiper assembly thereof.

Further objects and advantages of the invention will become apparent from the following description and claims, and from the accompanying drawings, wherein:

Figure 1 is a fragmentary perspective view showing the windshield of a motor vehicle and illustrating a windshield wiper assembly provided with the improved washing attachment of the present invention.

Figure 2 is an enlarged vertical cross sectional view taken on the line 2—2 of Figure 1, and illustrating the manner in which a washer jet tube according to the present invention is fastened to the underside of a windshield wiper blade supporting arm.

Figure 3 is an elevational view taken substantially on the line 3—3 of Figure 2.

Figure 4 is an enlarged vertical cross sectional view taken on the line 4—4 of Figure 3.

Figure 5 is an enlarged cross sectional detail view taken on the line 5—5 of Figure 3.

Figure 6 is a perspective view of the jet conduit employed in the windshield wiper arm attachment illustrated in Figures 1, 2 and 3.

Figure 7 is an enlarged cross sectional detail view taken on the line 7—7 of Figure 6.

Figure 8 is a fragmentary elevational view showing the wiper shaft housing and the liquid supply hose connection thereto in accordance with a modification of the invention.

Referring to the drawings, and more particularly to Figures 1 to 7, a pair of conventional windshield wiper blades, shown at 11, 11 are pivotally mounted on respective supporting arms 12, 12 and are oscillated by windshield wiper blade shafts 13, 13 in a conventional manner, the blades engaging on a motor vehicle windshield 14.

In accordance with the present invention, respective rigid liquid conduits 15 are detachably secured beneath the drive arms 12, the conduits 15 extending toward the respective windshield wiper blades 11, 11. Thus, as shown in Figure 2, the drive arm 12 is pivotally connected to the intermediate portion of the blade assembly 11, as by a conventional pivot joint 16. A rigid liquid conduit 15 is secured beneath the drive arm 12 by a pair of generally U-shaped spring clips 17, 17 which engage the opposite edges of respective rectangular plate elements 18, 18 secured to respective top surface portions of the rigid conduit 15. As shown in Figure 5, the clip members 17 are provided with the resilient depending clamping arms 19, 19 which are curved inwardly at their lower ends, as shown at 20, the arms 19, 19 being of sufficient length to extend beneath the side edges of the rectangular plate members 18 and to clampingly engage around said plate members so as to secure the conduit 15 against the bottom surface of the relatively flat drive arm 12.

The respective rigid liquid conduits 15 are formed at their forward ends with offset portions 21 of substantial length, said offset portions being closed at their forward ends, as shown at 22 in Figure 7. The offset portions are formed with respective inclined jet apertures 23 and 24 at their opposite end portions, said jet apertures being inclined downwardly and divergently relative to each other as is clearly shown in Figure 7.

As shown in Figure 3, each offset portion 21 is inclined so that it extends at a relatively large obtuse angle to the main body portion of its associated conduit 15, whereby said offset portion remains substantially parallel to the associated windshield wiper blade 11 over a large portion of the angle of oscillation of the blade.

As is further illustrated in Figure 3, the jet apertures 23 and 24 are directed downwardly and laterally with respect to the associated wiper blade 11 that is, the apertures are directed toward the associated windshield 14 and divergently outwardly relative to each other. As shown in Figure 2, the liquid emerging from the apertures 23 and 24 is in the form of a pair of overlapping jets impinging on the surface of the windshield 14 adjacent the mid portion of the windshield wiper blade 11.

Connected to the lower end of each rigid conduit 15 is a flexible hose 25, said hose being in turn connected to a respective conduit fitting 26 mounted laterally adjacent to the associated wiper shaft housing 27, as shown in Figure 3, being secured to the vehicle body wall portion 28 in the manner illustrated in Figure 4. Thus, the liquid conduit fitting 26 has a depending bottom portion 29 to which is connected a flexible conduit 30 leading to a suitable source of liquid under pressure and controlled by suitable means, such as a valve or the like having a control element on the dashboard of the vehicle so that the supply of liquid under pressure to the conduit 15 is controlled by the vehicle operator.

The liquid pressure source is conventional and forms no part of the present invention. It is understood that the liquid may be supplied to the rigid conduit 15 by means of a suitable pump, and that the pump may be operated by an electric motor or other suitable means. If an electric motor is the operating means, the supply of liquid to the conduit 15 may be controlled by a suitable switch connected in the energizing circuit of the electric motor driving the liquid pump.

In operation, liquid, such as water, or other suitable liquid, is supplied to the respective conduits 15 and emerges through the jet apertures 23, 24 in the form of outwardly divergent sprays directed towards the windshield 14 and impinging on the windshield subjacent the intermediate portions of the respective wiper blades 11. The liquid is thus distributed in a manner whereby the major portion of the liquid is spread over the windshield by the wiper blades, and whereby the windshield is cleared and wiped by the blades in a most effective manner.

In the modification illustrated in Figure 8, the connections of the flexible hose members 25 are made to conduit fittings 26' incorporated in the wiper shaft housings 27'. It will be understood that suitable passage means are provided in the shaft housings 27' to which the supply conduits 30 may be connected, whereby to supply the liquid under pressure to the respective rigid conduits 15 through their associated fittings 26′ and flexible hose members 25.

While certain specific embodiments of an improved windshield washing attachment for use on motor vehicle windshield wiper assemblies have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a windshield wiper assembly, a substantially flat oscillating drive arm, a wiper blade, means pivotally connecting the end of said drive arm to the intermediate portion of said blade, a rigid liquid liquid conduit, a plurality of flat plate elements secured to the top surface of said conduit, means clampingly securing said plate elements against the bottom surface of the drive arm, whereby to support said conduit beneath said drive arm in a position extending toward the blade, an offset portion on the end of said conduit adjacent the blade, said offset portion being closed at its end and being apertured to define a nozzle directed laterally relative to the blade, and a flexible conduit connected to the opposite end of said rigid conduit and adapted to be connected to a source of windshield-clearing liquid.

2. In a windshield wiper assembly, a substantially flat oscillating drive arm, a wiper blade, means pivotally connecting the end of said drive arm to the intermediate portion of said blade, a rigid liquid conduit, a plurality of flat plate elements secured to the top surface of said conduit, respective U-shaped spring clips engaged over the drive arm and around the edges of said plate elements and clampingly securing said plate elements against the bottom surface of the drive arm, whereby to support said conduit beneath said drive arm in a position extending toward the blade, an offset portion on the end of said conduit adjacent the blade, said offset portion being closed at its end and being formed with a plurality of apertures defining nozzles directed laterally relative to the blade, and a flexible conduit connected to the opposite end of said first-named conduit and adapted to be connected to a source of windshield-clearing liquid.

3. In a windshield wiper assembly, a substantially flat oscillating drive arm, a wiper blade, means pivotally connecting the end of said drive arm to the intermediate portion of said blade, a rigid liquid conduit, a plurality of flat plate elements substantially the same in width as said drive arm secured to the top surface of said conduit, respective U-shaped spring clips engaged over the drive arm and around the edges of said plate elements and clampingly securing said plate elements against the bottom surface of the drive arm, whereby to support said conduit beneath beneath said drive arm in a position extending toward the blade, an offset portion on the end of said conduit adjacent the blade, said offset portion being closed at its end and being formed with a pair of spaced apertures defining outwardly divergent nozzles directed laterally relative to the blade and directed toward the surface defined by the oscillation of the wiping edge of the blade, and a flexible conduit connected to the opposite end of said rigid conduit and adapted to be connected to a source of windshield-clearing liquid.

References Cited in the file of this patent

UNITED STATES PATENTS 2,059,224    French _____ Nov. 3, 1936

FOREIGN PATENTS 526,743    Canada _____ June 19, 1956